United States Patent Office 3,465,609
Patented Sept. 2, 1969

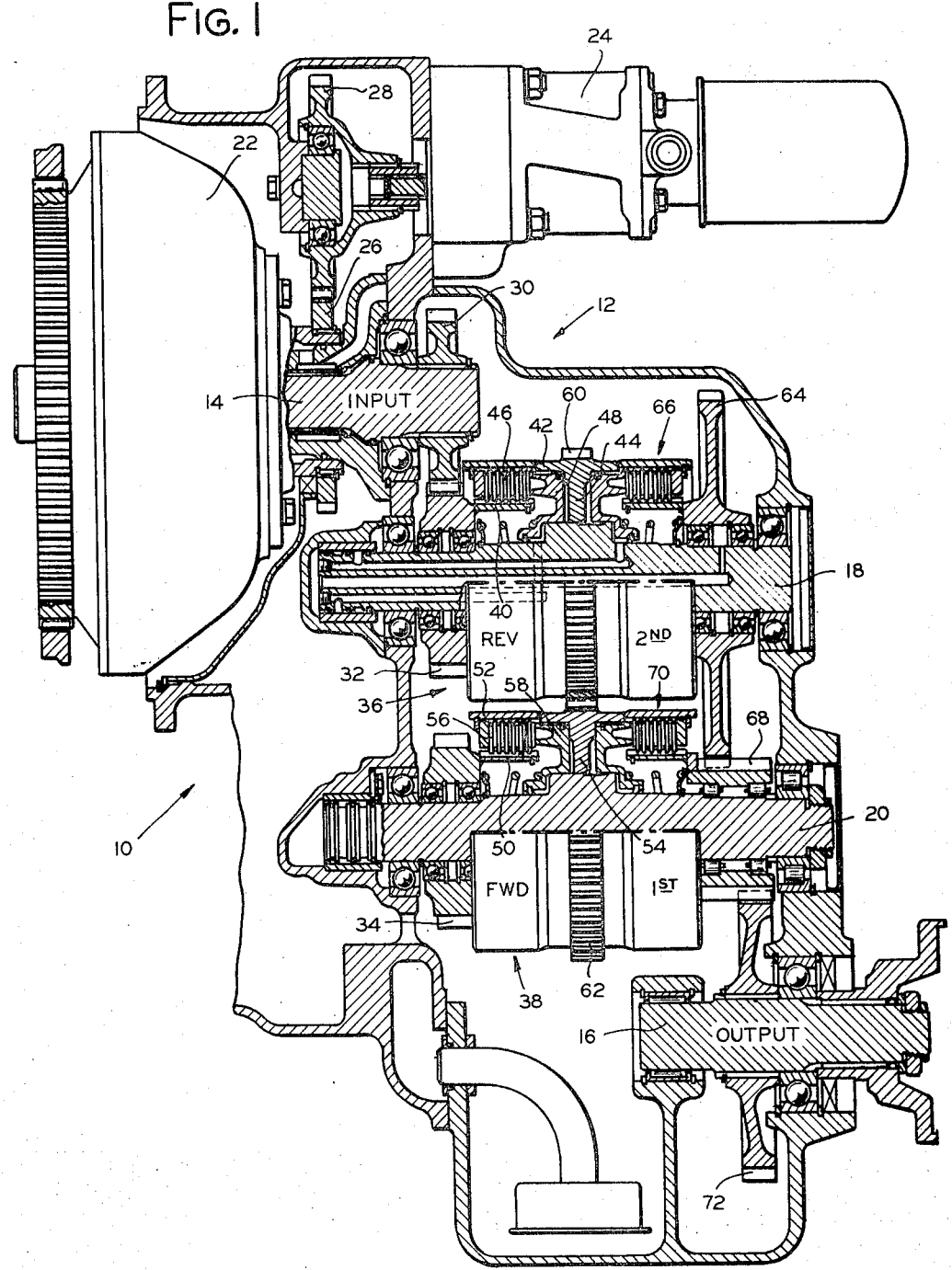

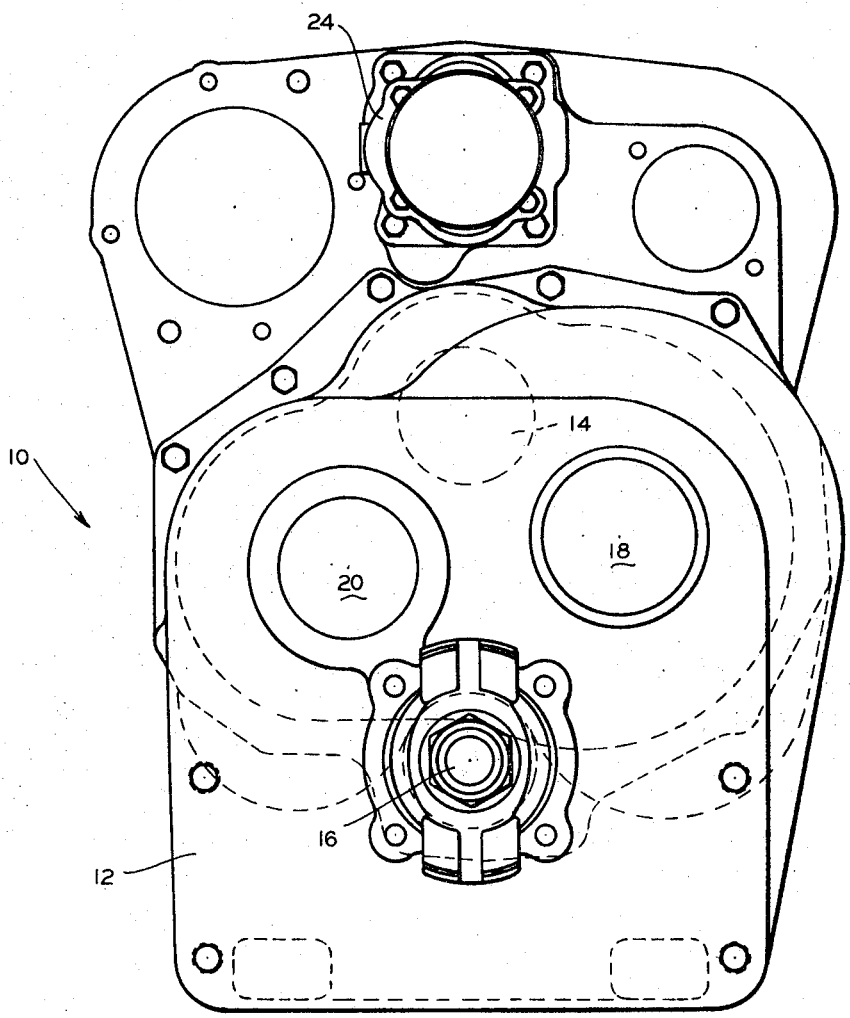

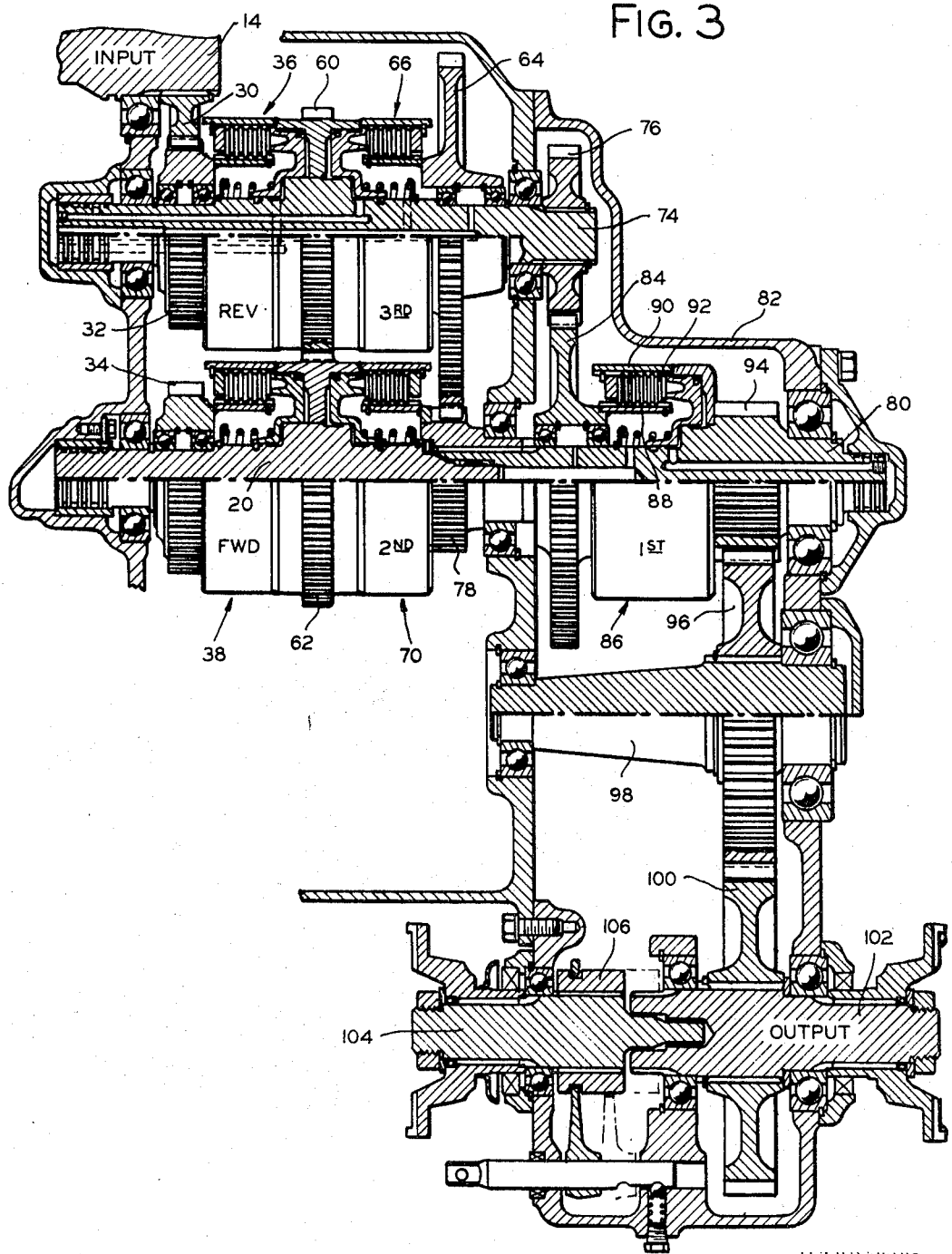

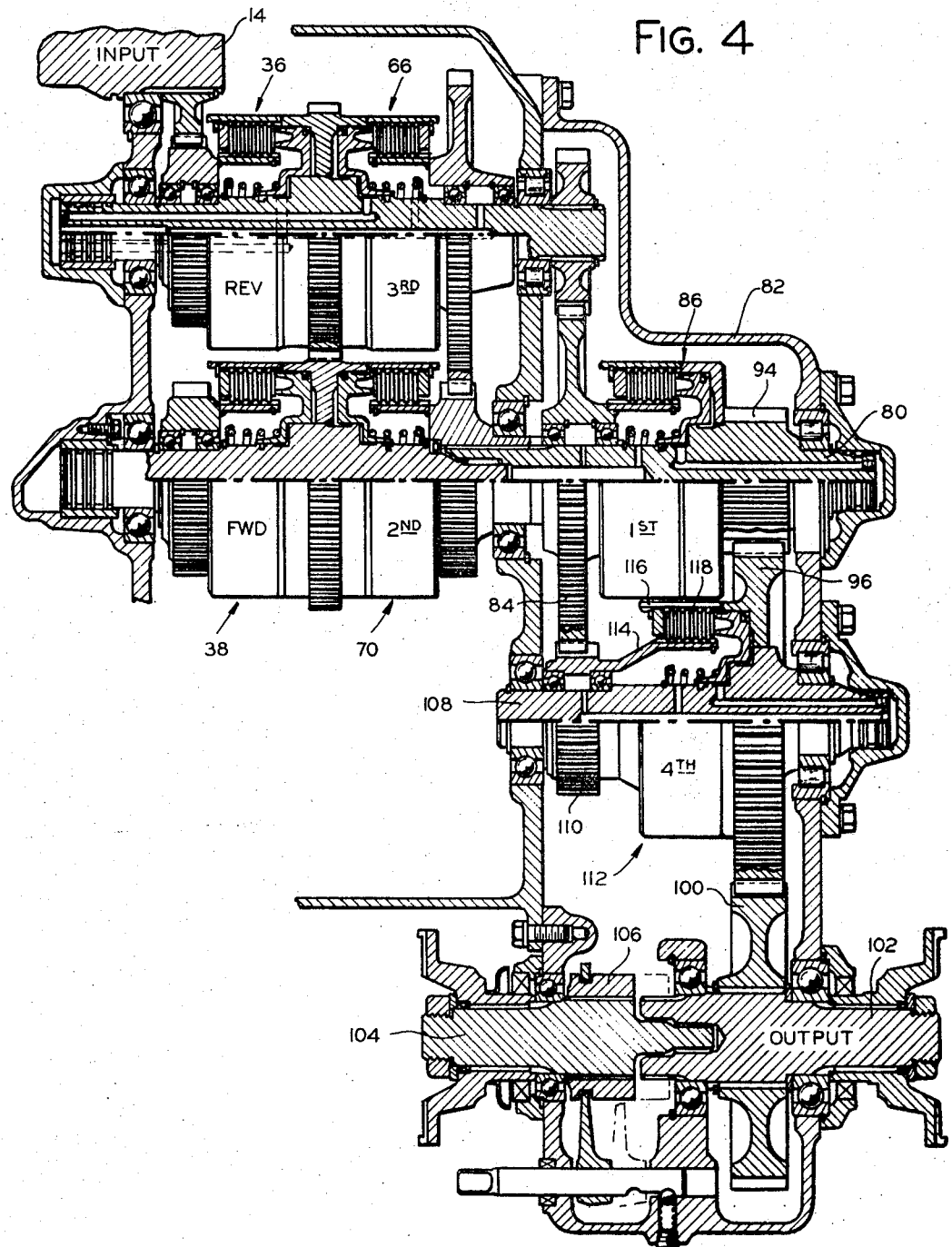

3,465,609
TRANSMISSION
John F. Fisher, Jackson, and Burton S. Zeller, Parma, Mich., assignors to Clark Equipment Company, a corporation of Michigan
Filed Dec. 13, 1967, Ser. No. 690,289
Int. Cl. F16h 3/08
U.S. Cl. 74—360                                3 Claims

ABSTRACT OF THE DISCLOSURE

A multi-speed reversible transmission having a pair of countershafts that are interconnected for opposite rotation and a plurality of gear trains for selectively connecting the countershafts to the output shaft.

Background of the invention

The field of art to which the invention pertains includes machine elements and mechanisms, and more specifically multiple forward and reverse gearing.

A principal object of our invention is to provide a basic multiple-speed reversible transmission to which additional gear sets may be added easily to provide additional speed ratios.

Summary of the invention

In carrying out our invention in a preferred embodiment thereof, we provide a pair of countershafts which are interconnected by a pair of meshing gears so that the countershafts rotate in opposite directions. Also, power input means serves to drive the countershafts in either direction of rotation and a pair of gear sets are arranged to selectively connect the countershafts to an output shaft. In a modification of our invention an additional gear set is provided between one of the countershafts and the output shaft to provide an additional speed ratio. In another modification of our invention an additional gear set is provided between the other countershaft and the output shaft to provide still another speed ratio.

The above and other objects, features and advantages of our invention will be more readily understood by persons skilled in the art when the following detailed description is taken in conjunction with the drawing.

Brief description of the drawing

FIGURE 1 is a longitudinal section of a preferred embodiment of our invention; and FIGURE 2 is an end elevation of the embodiment shown in FIG. 1 and shows to the advantage the actual locations of the various shafts;

FIGURE 3 is a longitudinal section of a modification of our invention; and

FIGURE 4 is a longitudinal section of another modification of our invention.

Description of the preferred embodiment

Referring now to FIGS. 1 and 2, the reference numeral 10 denotes generally a transmission having a housing 12 in which an input shaft 14, output shaft 16 and a pair of countershafts 18 and 20 are journaled for rotation.

Input shaft 14 is driven by means of a hydrodynamic torque converter 22 to which shaft 14 is connected, torque converter 22 begin in turn connected to any suitable source of power, such as an internal combustion engine, not shown. Also, torque converter 22 drives a pump 24 mounted on housing 12 through a pair of meshing gears 26 and 28 which are connected respectively to the torque converter and the drive shaft of the pump. Pump 24 serves to provide pressurized fluid to operate the various fluid actuated clutches associated with transmission 10.

Connected to input shaft 14 is an input gear 30 which meshes with a gear 32 mounted for rotation on countershaft 18 and a gear 34 mounted for rotation on countershaft 20. Gear 32 can be connected to countershaft 18 for conjoint rotation therewith by engagement of a clutch 36, and similarly gear 34 can be connected to countershaft 20 for conjoint rotation therewith by engagement of a clutch 38. Clutch 36 includes a hub 40 connected to gear 32 by any suitable means, such as welding, a double drum 42 which has a web 44 integral therewith, web 44 being fixed to countershaft 18 by any suitable means, such as welding, and a plurality of interleaved friction plates 46 connected between hub 40 and drum 42. Clutch 36 is engaged by supplying pressurized fluid behind a piston 48 which serves to press plates 46 together so that hub 40 is frictionally connected to drum 42 through plates 46.

Clutch 38 is a multiple plate fluid actuated type and includes a hub 50 connected to gear 34 by any suitable means, such as welding, a double drum 52 which has integral therewith a web fixed to countershaft 20 by any suitable means, such as welding, and a plurality of interleaved friction plates 56 connected between hub 50 and drum 52. Clutch 38 is engaged by supplying pressurized fluid behind a piston 58 which serves to press plates 56 together so that hub 50 is frictionally connected to drum 52.

At this point it will be noted that a gear 60 is integral with drum 42 and meshes with another gear 62 which is integral with drum 52. It will be obvious that countershafts 18 and 20 are interconnected so that for any given direction of rotation of one of the countershafts the other countershaft will rotate in the opposite direction. Also, because gear 30 meshes with gears 32 and 34, gears 32 and 34 are driven in opposite directions of rotation by gear 30. Thus, engagement of clutch 36 conditions transmission 10 for what we arbitrarily have designated reverse drive and engagement of clutch 38 conditions the transmission for what we arbitrarily have termed forward drive, assuming that input gear 30 is driven in a clockwise direction of rotation as viewed from the right in FIG. 1.

A gear 64 is mounted for rotation on countershaft 18 and can be connected to countershaft 18 for conjoint rotation therewith by a fluid actuated multiple plate clutch 66 which is identical to clutch 36, and so will not be described further. A gear 68 is mounted for rotation on countershaft 20 and meshes with gear 64. Gear 68 can be connected to countershaft 20 for conjoint rotation therewith by means of a fluid actuated multiple plate clutch 70 which is identical with clutch 38, and so will not be described in detail further. Gear 68 meshes with an output gear 72 which is fixed to output shaft 16. At this point it will be seen that a low or first speed ratio is provided by engaging clutch 70 so that countershaft 20 drives output shaft through the gear train comprising gears 68 and 72. A high or second speed ratio is provided by engaging clutch 66 so that countershaft 18 drives output shaft 16 through a gear train comprising gears 64, 68 and 72.

In view of the foregoing description it will be apparent that a first forward speed ratio is provided by the engagement of clutches 38 and 70, a second higher speed ratio is provided by continued engagement of clutch 38 and engagement of clutch 66 instead of clutch 70. By engaging clutch 36 and clutch 70 the low reverse speed ratio is provided and by releasing clutch 70 and engaging clutch 66 a high reverse speed ratio is provided.

Description of modification

Referring now to FIG. 3 there is shown a modification of our invention which provides three speed ratios in both forward and reverse. To the extent that this embodiment is the same as the above described embodiment, reference is made here to the preceding description, like reference numerals being applied to like parts. In this modification countershaft 18 has been replaced with a slightly longer countershaft 74 to one end of which a gear 76 is fixed. Also, gear 68 has been replaced with a similar gear 78 which is splined to a shaft 80 that is journaled for rotation in a housing 82.

Mounted for rotation on shaft 80 is a gear 84 which meshes with gear 76. Gear 84 can be connected to shaft 80 for conjoint rotation therewith by engagement of a fluid actuated multiple plate 86. Clutch 86 is similar to the clutches which have been described hereinabove and includes a hub 88 connected to gear 84, a drum 90 connected to shaft 80, and a plurality of interleaved friction plates 92 disposed between hub 88 and drum 90 and operable to frictionally connect them when pressed together. At this point it will be clear that shaft 80 can be driven from countershaft 74 via gears 64 and 78 when clutch 66 is engaged, or via gears 76 and 84 and by engagement of clutch 86 or driven from countershaft 20 directly to shaft 80 by engagement of clutch 70, thereby providing three different speed ratios.

Integral with shaft 80 is a gear 94 which meshes with gear 96 that is fixed to shaft 98 that is journaled for rotation in housing 82. Gear 96 meshes in turn with an output gear 100 which is fixed to a main output shaft 102 that is journaled for rotation in housing 82. Disposed coaxially with output shaft 102 is an auxiliary output shaft 104 that likewise is journaled for rotation in housing 82 and connectible to shaft 102 by means of a conventional sliding tooth clutch 106.

By engaging clutch 38 the transmission is conditioned for forward drive, and then by engaging either clutch 86, 70 or 66 first, second or third speed ratios, respectively, may be provided.

Description of second modification

Referring now to FIG. 4, the four-speed forward and reverse modification of our invention will be described. This embodiment generally is similar to portions of the embodiments shown in FIGS. 1, 2 and 3, and so to the extent of the similarity reference should be made to the foregoing description, like reference numerals being applied to like parts.

In this embodiment shaft 98 has been replaced by a slightly modified shaft 108 on which gear 96 is fixed, as before. Also, another gear 110 is mounted for rotation on shaft 108 and meshes with gear 84. Gear 110 can be connected to gear 96, and hence to shaft 108 for conjoint rotation therewith by engagement of a fluid actuated multiple plate clutch 112 which is similar to the previously described fluid actuated clutch 86, and includes a hub 114 integral with gear 110, a drum 116 connected to gear 96 by any suitable means, such as welding, and a plurality of interleaved friction plates disposed between hub 114 and drum 116 so that when plates 118 are pressed together hub 114 and drum 116 are frictionally connected together.

This embodiment is similar to the previously described embodiments in that the transmission may be conditioned for forward or reverse drive by engaging either clutch 38 or clutch 36, respectively. Any one of four speed ratios may be engaged by engaging either clutch 86, 70, 66 or 112 to provide first, second, third or fourth speed ratios, respectively.

While we have disclosed a preferred embodiment and two modifications thereof to provide additional speed ratios, it will be understood that this detailed description is intended for illustrative purposes only, and that our invention may be modified and changed without departing from the scope or spirit of it. Consequently, the limits of our invention should be determined from the following claims.

We claim:
1. A transmission comprising an input shaft, a first gear fixed to the said input shaft, a first countershaft, a second countershaft, a second gear mounted for rotation on the said first countershaft and in mesh with the said first gear, first clutch means for connecting the said second gear to the said first countershaft for conjoint rotation therewith, a third gear mounted for rotation on the said second countershaft and in mesh with the said first gear, second clutch means for connecting the said third gear to the said second countershaft for conjoint rotation therewith, a fourth gear fixed to the said first countershaft, a fifth gear fixed to the said second countershaft and in mesh with the said fourth gear, a sixth gear mounted for rotation on the said first countershaft, third clutch means for connecting the said sixth gear to the said first countershaft for conjoint rotation therewith, a seventh gear mounted for rotation on the said second countershaft and in mesh with the said sixth gear, fourth clutch means for connecting the said seventh gear to the said second countershaft for conjoint rotation therewith, an eighth gear fixed to the said first countershaft, a shaft fixed to the said seventh gear, a ninth gear mounted for rotation on the said shaft and in mesh with the said eighth gear, fifth clutch means for connecting the said ninth gear to the said shaft for conjoint rotation therewith, an output shaft, and means for drivingly connecting the said output shaft to the said ninth gear.

2. A transmission as set forth in claim 1 wherein the said connecting means includes a tenth gear fixed to the said shaft, an eleventh gear fixed to the said output shaft, a second shaft and a twelfth gear fixed to the said shaft and meshing with the said tenth and eleventh gears.

3. A transmission as set forth in claim 2 and including a thirteenth gear mounted for rotation on the said second shaft and meshing with the said ninth gear and sixth clutch means for connecting the said thirteenth gear to the said second shaft for conjoint rotation therewith.

References Cited

UNITED STATES PATENTS

| | | | |
|---|---|---|---|
| 2,972,901 | 2/1961 | Gerst | 74—360 |
| 3,102,432 | 9/1963 | Gerst | 74—360 |
| 3,254,541 | 6/1966 | Schou | 74—360 |
| 3,350,951 | 11/1967 | Frost et al. | 74—360 |

ARTHUR T. McKEON, Primary Examiner

U.S. Cl. X.R.

74—364